United States Patent
Bui et al.

(10) Patent No.: US 7,982,988 B2
(45) Date of Patent: Jul. 19, 2011

(54) COMBINING INFORMATION FROM PARALLEL SERVO CHANNELS

(75) Inventors: Nhan X. Bui, Tucson, AZ (US);
Giovanni Cherubini, Rueschlikon (CH);
Roy D. Cideciyan, Rueschlikon (CH);
Robert A. Hutchins, Tucson, AZ (US);
Jens Jelitto, Rueschlikon (CH);
Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 12/400,369

(22) Filed: Mar. 9, 2009

(65) Prior Publication Data
US 2010/0226037 A1 Sep. 9, 2010

(51) Int. Cl.
*G11B 27/36* (2006.01)
*G11B 5/584* (2006.01)

(52) U.S. Cl. .................. 360/31; 360/77.14; 360/46

(58) Field of Classification Search .................. None
See application file for complete search history.

(56) References Cited

U.S. PATENT DOCUMENTS

| | | | |
|---|---|---|---|
| 5,311,380 A | 5/1994 | Murata et al. | |
| 5,568,327 A | 10/1996 | Pahr et al. | |
| 5,717,538 A | 2/1998 | Cheung et al. | |
| 6,724,561 B1 | 4/2004 | Wyman | |
| 6,914,744 B1 | 7/2005 | Wang | |
| 6,992,857 B2 | 1/2006 | Knowles et al. | |
| 7,164,550 B2 | 1/2007 | Kisaka | |
| 7,193,812 B2 | 3/2007 | Eaton | |
| 7,480,114 B2 * | 1/2009 | Cherubini et al. | 360/73.12 |

* cited by examiner

*Primary Examiner* — Daniell L Negrón
*Assistant Examiner* — Regina N Holder
(74) *Attorney, Agent, or Firm* — Dan Shifrin

(57) ABSTRACT

A weighted combining scheme exploits information from two servo channels operating in parallel. A timing-based servo module servo module comprises two servo channels coupled respectively to receive two digital servo signals read from a data tape. Both channels have outputs for an unweighted metric and for a measure of the channel reliability. A weight computation module provides first and second weight signals using the measures of channel reliability from the servo channels. A first multiplying node receives a first unweighted metric and a first weight signal and is operable to output a first weighted metric. A second multiplying node receives a second unweighted metric and a second weight signal and outputs a second weighted metric. A summing node receives the first and second weighted metrics and outputs a combined weighted metric to an LPOS word decoder.

20 Claims, 9 Drawing Sheets

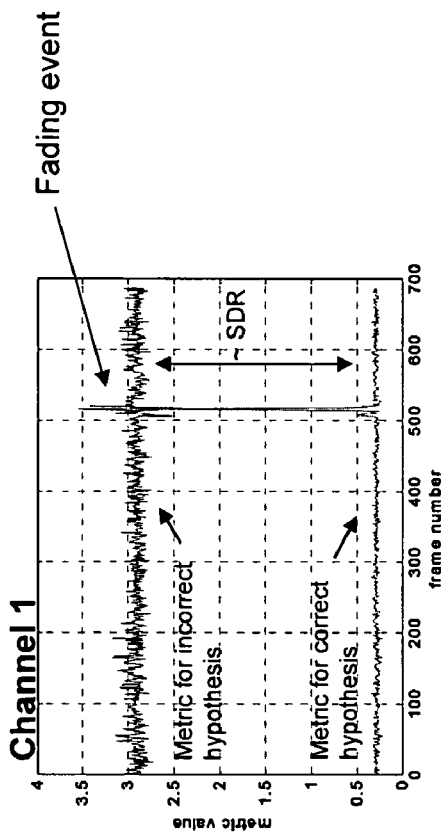
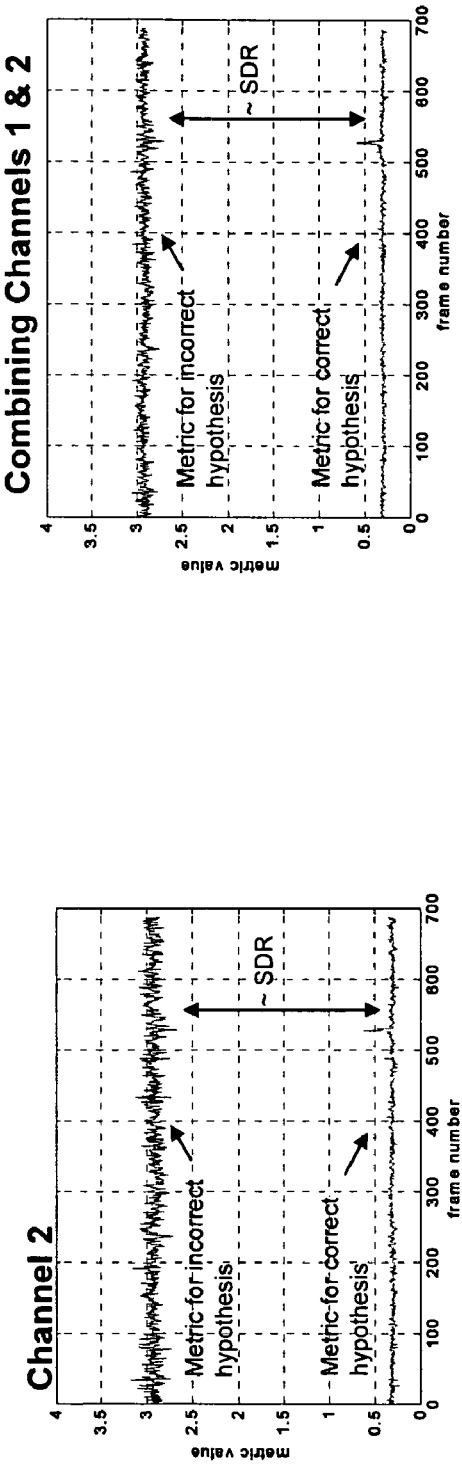
FIG. 5
FIG. 6

COMBINING INFORMATION FROM PARALLEL SERVO CHANNELS

RELATED APPLICATION DATA

The present application is related to commonly-assigned and co-pending U.S. application Ser. No. 12/400,420, entitled COMBINING INFORMATION FROM PARALLEL SERVO CHANNELS, filed on the filing date hereof, which application is incorporated herein by reference in its entirety.

TECHNICAL FIELD

The present invention relates generally to linear tape drives and, in particular, to timing-based servo technology used to determine the longitudinal and transverse positions of the tape head.

BACKGROUND ART

Timing-based servo (TBS) is a technology developed for linear tape drives. In TBS systems, recorded servo patterns consist of transitions with two different azimuthal slopes. Head position is derived from the relative timing of pulses, or dibits, generated by a narrow head reading the servo patterns. TBS patterns also allow the encoding of additional longitudinal position (LPOS) information without affecting the generation of the transversal position error signal (PES). This is obtained by shifting transitions from their nominal pattern position using pulse-position modulation (PPM). A specification for the servo format in current midrange tape drives is provided by the linear tape-open (LTO) format. The complete format for LTO drives of generation 1 (LTO-1) was standardized by the European Computer Manufacturers Association (ECMA) in 2001 as ECMA-319. Additional information on LTO technology, in particular on LTO drives of generations 2 to 4 (LTO-2 to LTO-4), where the servo format was not modified, can be found on the World Wide Web (www) at ultrium.com. Traditionally, the detection of LPOS information bits is based on the observation of the shifts of the arrival times of the dibit peaks within the servo bursts at the servo reader output (R. C. Barrett, E. H. Klaassen, T. R. Albrecht, G. A. Jaquette, and J. H. Eaton, "Timing-based track-following servo for linear tape systems", IEEE Transactions on Magnetics, Vol. 34, Issue 4, Part 1, pp. 1872-1877, July 1998). Detection of LPOS bits may also be performed by a matched-filter detector (G. Cherubini, E. Eleftheriou, R. Hutchins, and J. Jelitto, "Synchronous Servo Channel for Tape Drive Systems," U.S. Pat. No. 7,365,929 issued Apr. 28, 2008).

In tape drives, two dedicated servo channels are normally available from which LPOS information and PES can be derived. One of the two available servo channels is initially selected to provide the LPOS information and PES. The initial selection is maintained as long as satisfactory channel operation is observed. If the performance of the selected servo channel deteriorates, the drive switches to the other servo channel to obtain the required LPOS information and PES. In an alternative method, the two servo channels provide reliability information about LPOS symbols and at the end of each servo frame, the LPOS symbol having the highest assigned reliability is chosen. However, the signal from one servo reader may occasionally fade while the signal from the other reader might not be affected. In such an event, the servo channel affected by fading loses timing and needs to undergo re-acquisition of the channel parameters. Consequently, additional latency and loss of information is experienced.

SUMMARY OF THE INVENTION

The present invention provides a novel weighted combining scheme to exploit information from two servo channels operating in parallel. In one embodiment, a timing-based servo module is provided in a linear tape drive. The servo module comprises first and second servo channels, which may be synchronous servo channels, coupled respectively to receive first and second digital servo signals read from a data tape by servo elements. The first servo channel comprises a first output for a first unweighted metric and a second output for a first measure of the channel reliability. Similarly, the second servo channel comprises a first output for a second unweighted metric and a second output for a second measure of the channel reliability. The servo module further comprises a weight computation module operable to provide a first weight signal and a second weight signal using the measures of channel reliability from the first and second servo channels. The servo module also comprises a first multiplying node, coupled to receive the first unweighted metric and the first weight signal and operable to output a first weighted metric, and a second multiplying node, coupled to receive the second unweighted metric and the second weight signal and operable to output a second weighted metric. The servo module further comprises a summing node coupled to receive the first and second weighted metrics and operable to output a combined weighted metric to an LPOS word decoder.

Another embodiment provides a data storage tape drive which comprises, among other components, a timing-based servo module of the previous embodiment. Further embodiments provide methods for decoding LPOS information from parallel channels of a timing-based servo module in a linear tape drive and a computer program product having computer-readable code embodied therein for decoding LPOS information from parallel channels of a timing-based servo module in a linear tape drive.

BRIEF DESCRIPTION OF THE DRAWINGS

FIG. 5 is a set of plots of metric values for two servo channels, one of which has experienced a fading event;

FIG. 6 is a plot of metric values for the two servo channels after being combined by the present invention during the same servo frames as shown in FIG. 2;

DETAILED DESCRIPTION OF THE PREFERRED EMBODIMENT

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organized as an object, procedure, or function. A module of executable code could be a single instruction, or many instructions, and may even be distributed over several different code segments, among different programs, and across several memory devices.

Furthermore, the described features, structures, or characteristics of the invention may be combined in any suitable manner in one or more embodiments. In the following description, specific details are provided, such as examples of programming, software modules, hardware modules, hardware circuits, etc., to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

The logical flow chart diagrams that follow are generally indicative of one embodiment of the presented process. Other steps and processes may be conceived that are equivalent in function, logic, or effect to one or more steps, or portions thereof, of the illustrated process. Additionally, the format and symbols employed are provided to explain the logical steps of the process and are understood not to limit the scope of the process. And, the order in which a particular process occurs may or may not strictly adhere to the order of the corresponding steps shown.

Figure 1:
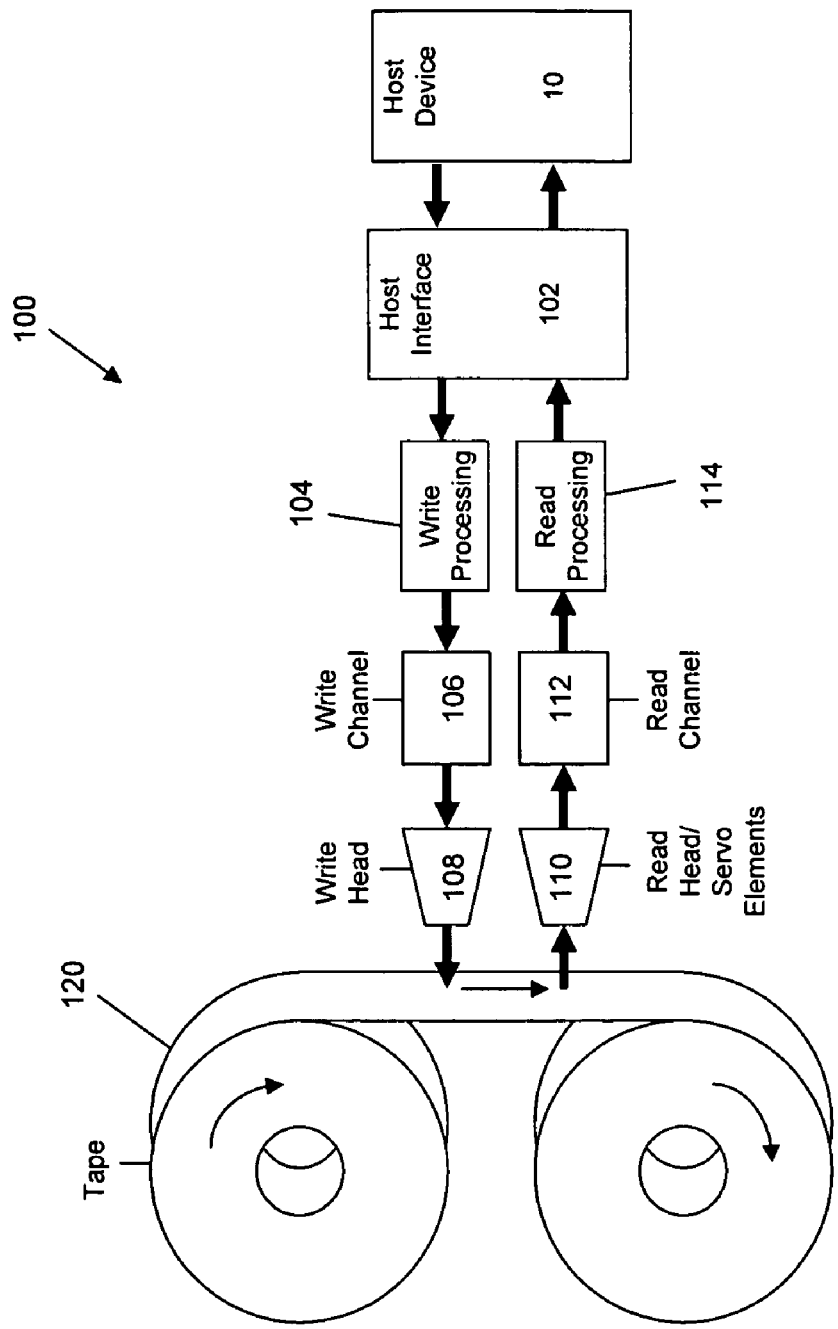
FIG. 1 is a block diagram of a data tape drive in which the present invention may be implemented.

FIG. 1 is a block diagram of a data tape drive 100 in which the present invention may be implemented. The drive 100 is coupled to a host device 10 with a host interface 102 through which data and commands are communicated. Data to be written to the tape 120 is processed in a write processing module 104 and a write channel 106 before being written to the tape 120 moving past a write head 108. Data is read from the tape 120 moving past a read head 110 and processed by a read channel 112 and a read processing module 114 before being transmitted to the host device 10 through the host interface 102. Details of these steps and components are well known in the art and are not necessary to an understanding of the present invention.

Figure 2:
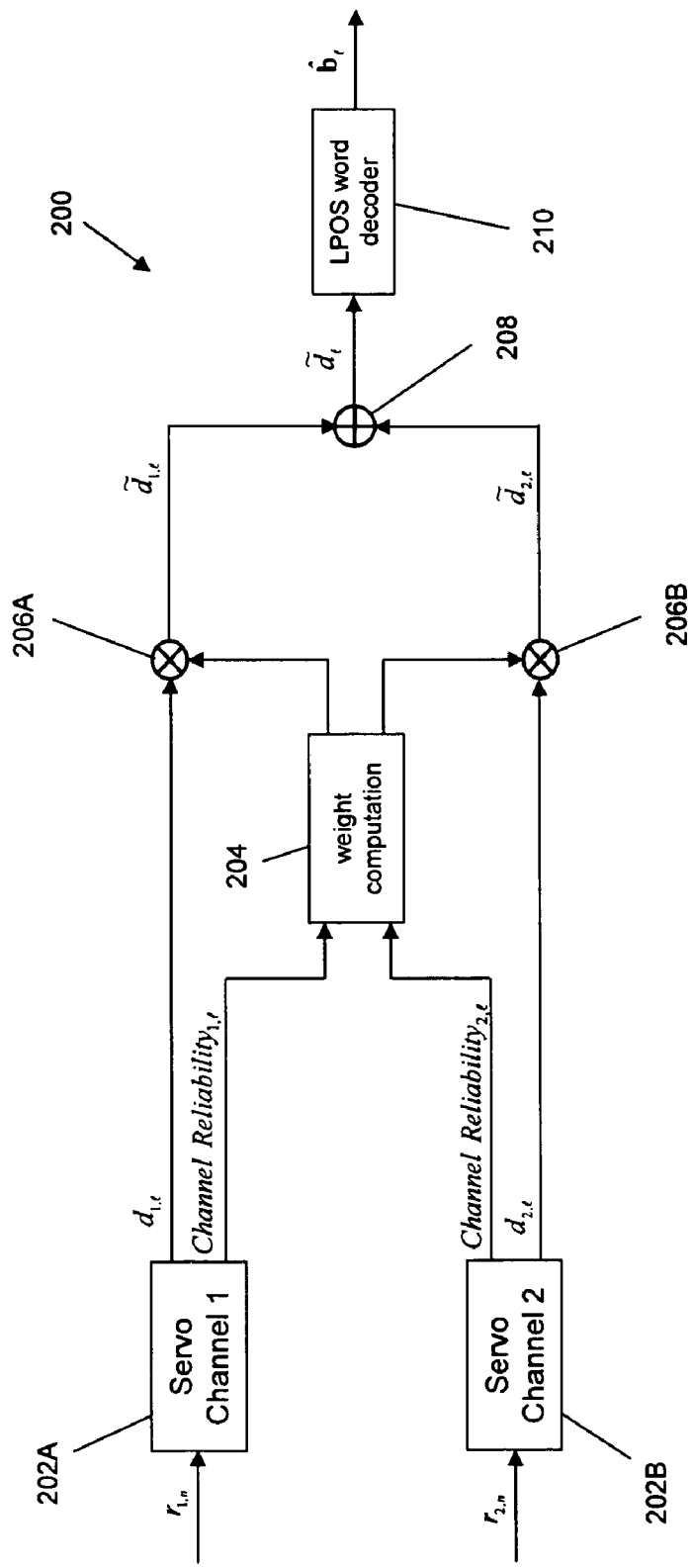
FIG. 2 is a block diagram of one embodiment of a timing-based servo module of the present invention introducing weighted combining of soft information from the servo channels to improve the reliability of LPOS bit detection.

As is also known, the tape 120 is formatted into a number of parallel data tracks, such as 512. Servo bands are interleaved among the data tracks and are formatted in a pattern to provide longitudinal position (LPOS) information and a transversal position error signal (PES). In addition to the read head 110 having multiple elements to read data simultaneously from multiple tracks, the read head 110 also includes a number of servo elements to detect the servo information from the servo bands. For example the read head may include two servo elements to detect the servo patterns on two servo bands between which are parallel data tracks. FIG. 2 is a block diagram of one embodiment of a timing-based servo module 200 of the present invention. As illustrated in FIG. 2, signals from the two servo elements are processed by two servo channels 202A, 202B, which may be synchronous servo channels.

The optimum matched-filter detection of LPOS symbols and concurrent monitoring of the reliability of the LPOS detection process in a servo channel is based on a metric, which for a binary LPOS symbol $b_l \in \{0,1\}$ yields the likelihood of the two hypotheses $H_{b_l=0}$ and $H_{b_l=1}$. A sequence of [4 4 5 5] dibits is characteristic of the sequence of C, D, A, and B servo bursts of a servo frame in LTO tape drives. The encoding of LPOS symbols is obtained by applying PPM to the second and fourth dibit of the A and B bursts. Recalling the formulation of the optimum matched-filter receiver for the detection of waveform signals from a given set in the presence of additive white Gaussian noise (AWGN), the likelihood of the hypothesis $H_{b_l=\beta}$, $\beta \in \{0,1\}$ is represented by the metric values $m_{\beta,l} = m(r_l | b_l = \beta)$, $\beta \in \{0,1\}$, where $r_l$ denotes the vector of received signal samples in the l-th servo frame. In an individual servo channel, an optimum LPOS symbol detector computes the metric values $m_{\beta,l}$, $\beta = 0,1$, and compares them to produce a decision $\hat{b}_l$ on the LPOS symbol encoded in the l-th servo frame, i.e., $$\hat{b}_l = \begin{cases} 0, & \text{if } m_{0,l} \leq m_{1,l} \\ 1, & \text{otherwise.} \end{cases} \quad (1)$$

Weighted combining of soft information from the servo channels is introduced to improve the reliability of LPOS bit detection. In this manner, optimal use is made of the total available LPOS information from the two servo channels 202A, 202B. Preferably, the soft information from each servo channel is provided by a matched-filter detector. The soft information on LPOS detection is then given by the value of the metrics that the matched-filter detector computes for the two hypotheses corresponding to the binary LPOS symbols. At each servo frame an individual servo channel outputs soft information on a detected LPOS symbol that is given by the metric value $$d_{\zeta,l} = m_{0,l}^{(\zeta)} - m_{1,l}^{(\zeta)}, \quad (2)$$

and a measure of the servo channel reliability where the index $\zeta$ takes values 1 and 2 for servo channels 202A and 202B, respectively.

The weights are derived in a weight computation module 204 from the measure of the channel reliability that is presented at the output of each servo channel. A first weight signal from the weight computation module 204 is used by a first multiplying node 206A to multiply unweighted metrics $d_{1,l}$ from the first servo channel 202A by a first weight to generate weighted metrics $\tilde{d}_{1,l}$ for the first channel 202A. Similarly, a second weight signal from the weight computation module 204 is used by a second multiplying node 206B to multiply unweighted metrics $d_{2,l}$ from the second servo channel 202B by a second weight to generate weighted metrics $\tilde{d}_{2,l}$ for the second channel 202B. A summing node 208 adds the two weighted metrics and outputs a combined weighted metric $\tilde{d}_l$ to an LPOS word decoder 210. The LPOS word decoder produces a decision $\hat{b}_l$ on the LPOS symbol encoded in the l-th servo frame, given by $$\hat{b}_l = \begin{cases} 0, & \text{if } \tilde{d}_l \leq 0 \\ 1, & \text{otherwise.} \end{cases} \quad (3)$$

By using the metric adopted for hypothesis testing, a measure of the signal-to-distortion ratio (SDR) associated with LPOS detection is introduced, which allows monitoring of the LPOS detection process and of the reliability of the LPOS symbol decisions. The adopted measure of the signal-to-distortion ratio is directly proportional to the square of the difference of the average values of the metrics for correct and incorrect hypotheses and inversely proportional to the sum of the variances of the metrics for correct and incorrect hypotheses. Defining the quantities $M_c$ and $\sigma_{M_c}^2$ to denote the mean and the variance of the metric for the correct hypothesis, respectively, and $M_I$ and $\sigma_{M_I}^2$ to denote the mean and the variance of the metric for the incorrect hypothesis, respectively, the average signal-to-noise plus distortion ratio at the detection point of a servo channel is estimated as $$SDR = 20\log\left(\frac{|M_I - M_C|}{\sqrt{\sigma_{M_I}^2 + \sigma_{M_C}^2}}\right). \quad (4)$$

Figure 3:
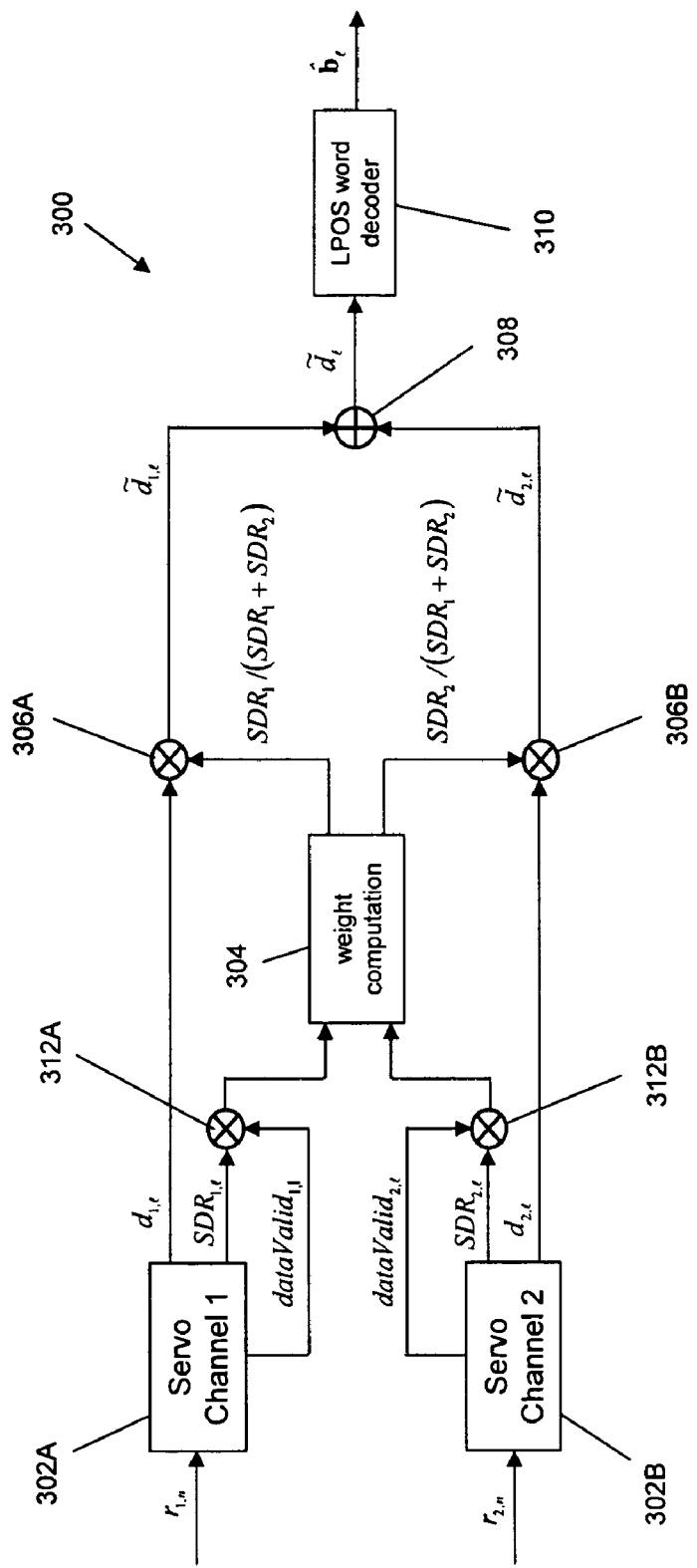
FIG. 3 is a block diagram of another embodiment of a timing-based servo module of the present invention introducing weighted combining of soft information from the servo channels, where signal to distortion ratios from the servo channels are used to improve the reliability of LPOS bit detection.

FIG. 3 is a block diagram showing another embodiment of weighted combining of soft information from the servo channels, which is introduced to improve the reliability of LPOS bit detection, where an estimate of the SDR is used as a measure of channel reliability. The SDR is denoted by $SDR_{\zeta,l}$, where the index $\zeta$ takes values 1 and 2 for servo channels 302A and 302B, respectively.

The weights are derived in a weight computation module 304 from the measure of the SDR that is presented at the output of each servo channel. A first weight signal from the weight computation module 304, $SDR_1/(SDR_1+SDR_2)$, is used by a first multiplying node 306A to multiply unweighted metrics from the first servo channel 302A by a first weight to generate weighted metrics $\tilde{d}_{1,l}$ for the first channel 302A. Similarly, a second weight signal from the weight computation module 304, $SDR_2/(SDR_1+SDR_2)$, is used by a second multiplying node 306B to multiply unweighted metrics from the second servo channel 302B by a second weight to generate weighted metrics $\tilde{d}_{2,l}$ for the second channel 302B. A summing node 308 adds the two weighted metrics and outputs a combined weighted metric $\tilde{d}_l$ to an LPOS word decoder 310. The LPOS word decoder produces a decision $\hat{b}_l$ on the LPOS symbol encoded in the l-th servo frame, given by (4).

Each servo channel 302A, 302B may also output a flag, such as a dataValid signal, indicating whether the servo channel is operating correctly, in which case it assumes a value equal to one. Interruption of proper servo channel operation, signaled by a dataValid signal assuming zero value, may be determined, e.g., by a fading event. A node 312A, 312B associated with each channel serves to prevent the SDR signal from being transmitted to the weight computation module 304 in the manner of a switch, whenever the dataValid signal assumes zero value.

Figure 4:
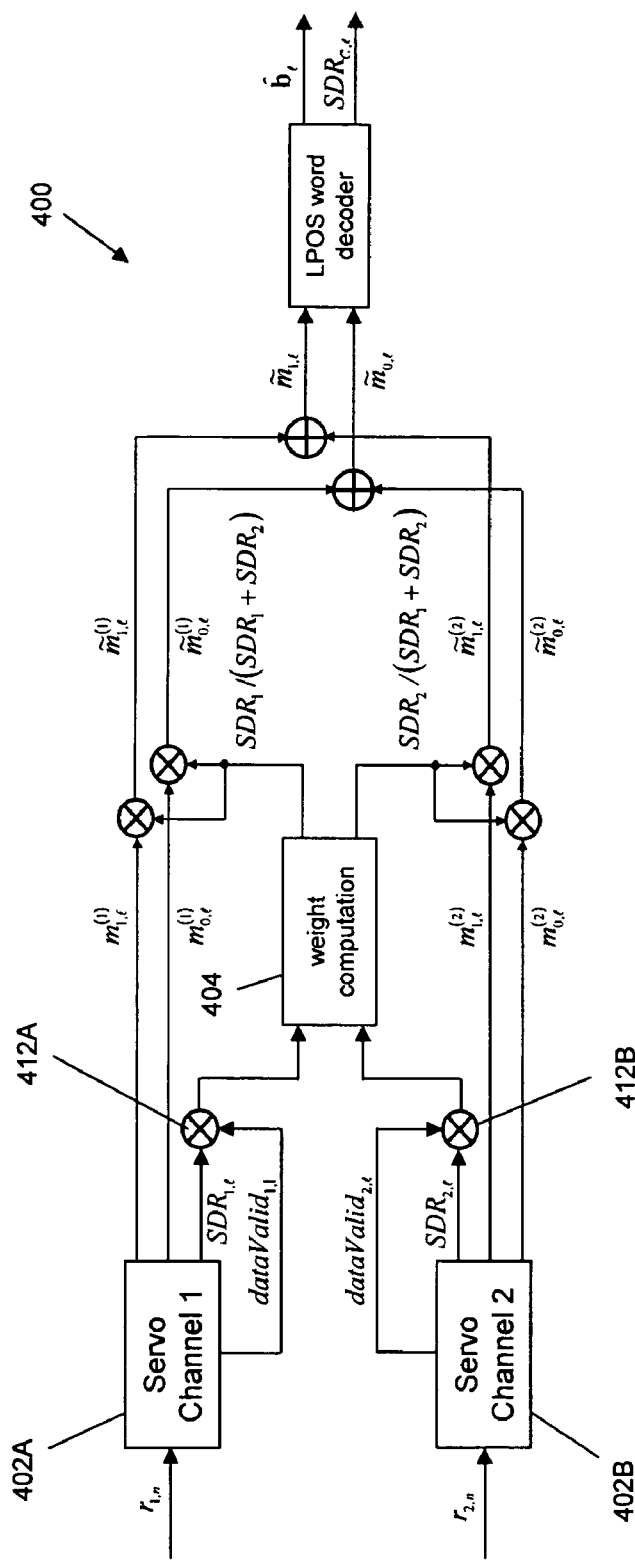
FIG. 4 is a block diagram of a third embodiment of a timing-based servo module of the present invention introducing weighted combining of soft information from the servo channels, where signal to distortion ratios from the servo channels are used to improve the reliability of LPOS bit detection.

FIG. 4 is a block diagram of a third embodiment of a timing-based servo module 400 of the present invention. At each servo frame an individual servo channel directly outputs the soft information on a detected LPOS symbol that is given by the metric values $m_{0,l}^{(\zeta)}$ and $m_{1,l}^{(\zeta)}$, and an estimate of the SDR denoted by $SDR_{\zeta,l}$, where the index $\zeta$ takes values 1 and 2 for servo channels 402A and 402B, respectively. The weights are derived as in the first embodiment in a weight computation module 404 from the measure of the SDR that is presented at the output of each servo channel. A first weight signal from the weight computation module 404, $SDR_1/(SDR_1+SDR_2)$, is used by multiplying nodes to multiply unweighted metrics from the first servo channel 402A by a first weight to generate weighted metrics $\tilde{m}_{0,l}^{(1)}$ and $\tilde{m}_{1,l}^{(1)}$ for the first channel 402A. Similarly, a second weight signal from the weight computation module 404, $SDR_2/(SDR_1+SDR_2)$, is used by a second multiplying node 406B to multiply unweighted metrics from the second servo channel 402B by a second weight to generate weighted metrics $\tilde{m}_{0,l}^{(2)}$ and $\tilde{m}_{1,l}^{(2)}$ for the second channel 402B. A first summing node adds the weighted metrics $\tilde{m}_{0,l}^{(1)}$ and $\tilde{m}_{0,l}^{(2)}$ to yield a combined weighted metric $\tilde{m}_{0,l}$ whereas a second summing node adds the weighted metrics $\tilde{m}_{1,l}^{(1)}$ and $\tilde{m}_{1,l}^{(2)}$ to yield a combined weighted metric $\tilde{m}_{1,l}$. The LPOS word decoder produces a decision $\hat{b}_l$ on the LPOS symbol encoded in the l-th servo frame, given by $$\hat{b}_l = \begin{cases} 0, & \text{if } \tilde{m}_{0,l} \leq \tilde{m}_{1,l} \\ 1, & \text{otherwise.} \end{cases} \quad (5)$$

The performance of the systems in the embodiments is the same. In the third embodiment, however, the word decoder also computes an estimate of the SDR after combining, denoted by $SDR_{C,l}$, based on the statistics of the weighted metrics $\tilde{m}_{1,l}^{(1)}$ and $\tilde{m}_{1,l}^{(2)}$, as indicated in (4).

FIG. 5 shows graphs illustrating a set of plots of metric values generated by both of the servo channels. The upper line in each graph represents the frame-by-frame metric value generated by the servo channel based upon an incorrect hypothesis, while the lower line in each graph represents the metric value generated by the servo channel based upon the correct hypothesis. The distance between the two plot lines may be regarded as an approximation of the SDR. The smaller the separation between the two plot lines, the smaller the SDR and the greater the probability of an error by the servo channel in accurately decoding the information from the servo pattern. The graph for the first channel shows a fading event at approximately frame 510. It can be seen that the metric values for the correct and incorrect hypothesis are very close together during the fading event. Because the second channel does not experience a fading event, adequate separation between the two plot lines, and therefore sufficiently large SDR, is maintained. However, if the tape drive 100 is then relying on the first servo channel when the fading event occurs, there is a non-negligible probability of error in LPOS symbol detection.

FIG. 6 is a plot showing the metric values for the correct and incorrect hypothesis after being weighted and combined in accordance with the second embodiment of the present invention. FIG. 6 illustrates the restoration of an adequate SDR during the fading event of the first channel.

Figure 7B:
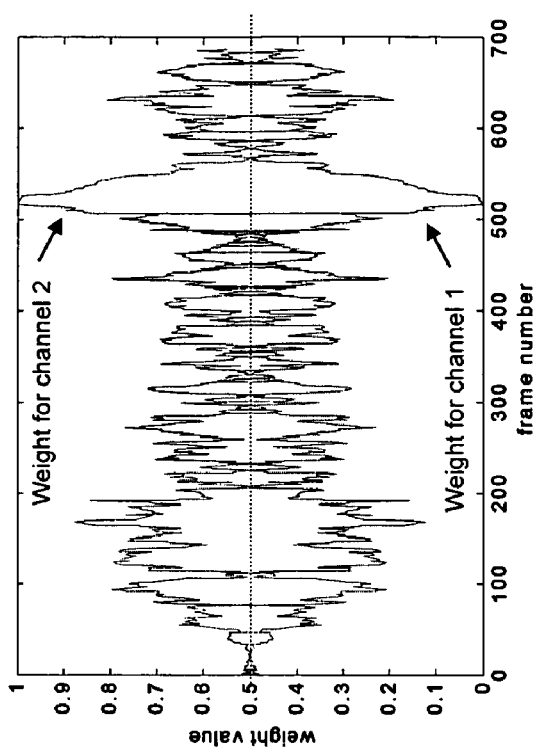
FIG. 7B is a plot of the weight values of the outputs of the two servo channels during the same servo frames as shown in FIG. 5A.
Figure 7A:
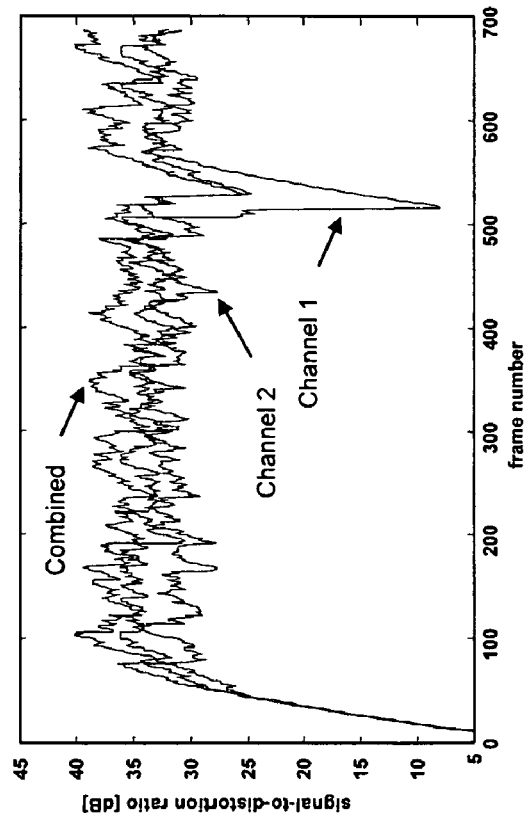
FIG. 7A is a plot of the signal to distortion ratios of the outputs of the two servo channels separately and when combined.

FIG. 7A is a plot of the SDR of the two servo channels 302A, 302B and the combined SDR generated by the timing-based servo module 300 in accordance with the second embodiment of the present invention. The value of the combined SDR is significantly higher than the values of the SDR provided by the individual servo channels, which indicates the higher reliability of LPOS decoding obtained by the combining method. The plot of FIG. 7B illustrates the values assumed by the weights for the two channels, which are output by the weight computation module 304. During the fading event of the first channel 302A, the weight for the metric provided by the first channel is close to or at zero. The dotted line indicates a weight value equal to 0.5 for both the two channels. It corresponds to equal-gain combining, which is usually adopted in systems where no reliability information on the symbol decisions is provided by the individual channels.

Figure 8:
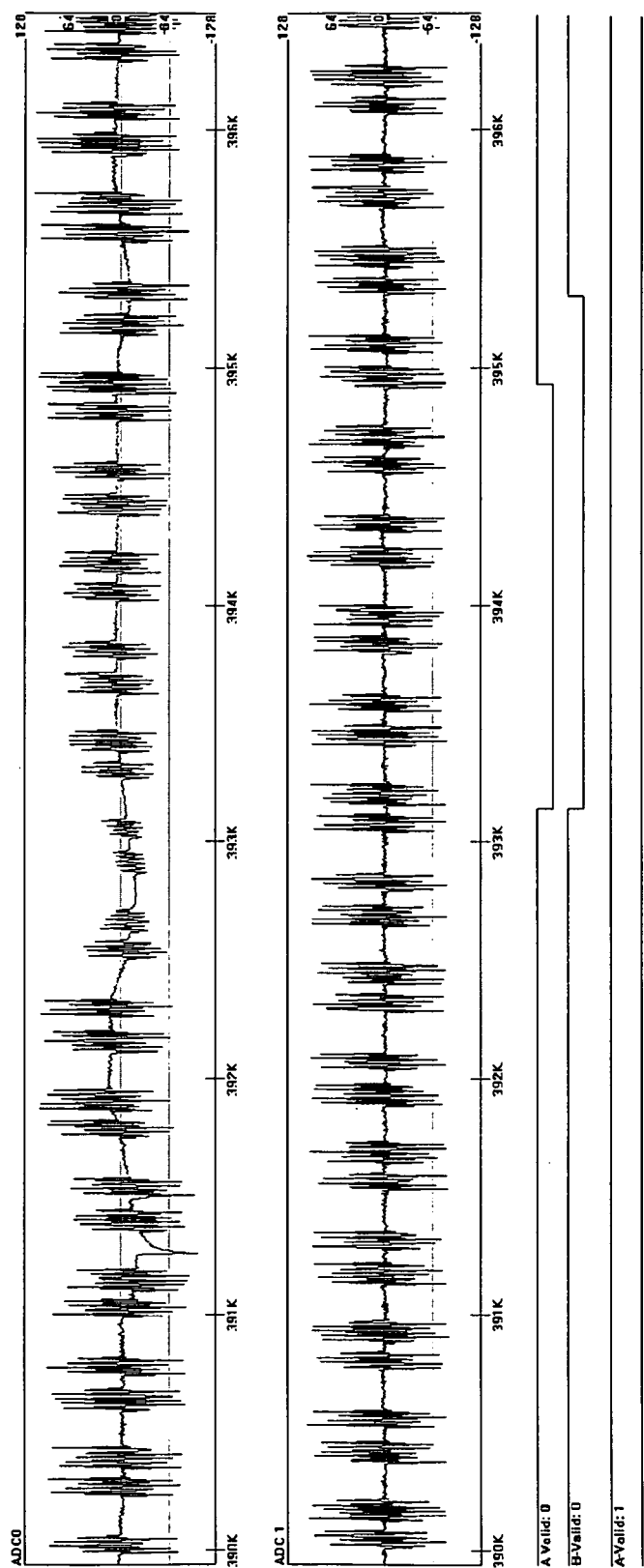
FIG. 8 is a plot of the input of the two servo channels illustrating the displacement of the relative longitudinal position of the servo frames and a fading event in one of the servo channels.

FIG. 8 shows at the top sequences ADC0 and ADC1 of servo signal samples that are input to the first and second servo channels, respectively. The units on the horizontal axis correspond to normalized time. The two sequences ADC0 and ADC1 contain the same information encoded in the A, B, C, D servo bursts, as mentioned earlier. However, there is a displacement of the servo pattern of one band relative to the other, which results in a delay of sequence ADC0 relative to sequence ADC1. The fading event on sequence ADC0 causes channel 1 to lose timing while reading the frame that ends at about time index 393K. As a consequence, the dataValid flags for channel 1 assume value equal to zero. Re-synchronization is completed three frames later, when the dataValid flags assume again value equal to one.

Figure 9:
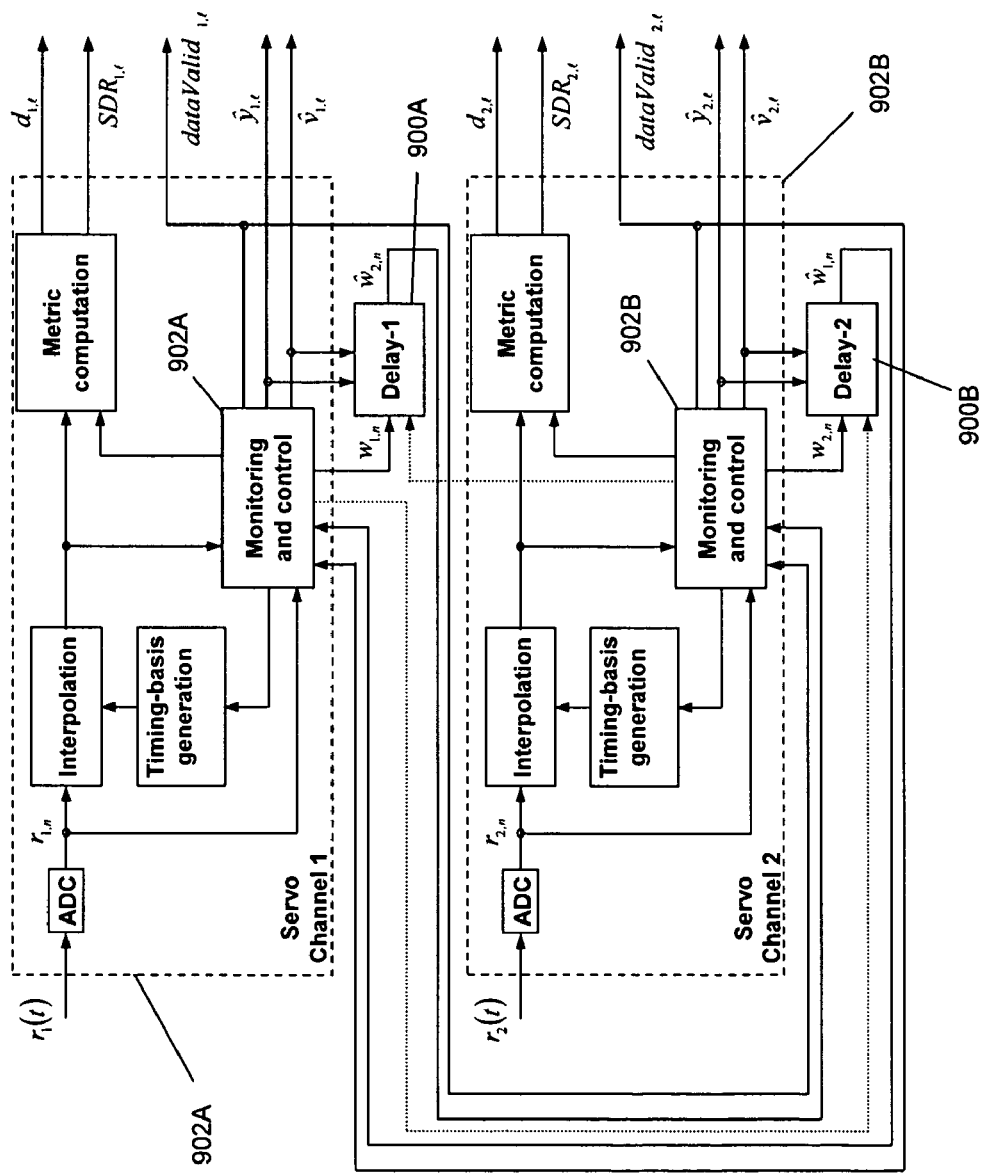
FIG. 9 is a block diagram of another embodiment of the present invention in which pseudo-timing signals are generated.

In a further embodiment, illustrated in the block diagram of FIG. 9, timing information is continuously provided from one channel to the other. In case one channel loses timing, due, for example, to fading of the servo reader signal, the fading channel continues to monitor the servo reader signal based on the timing information from the good channel. This is possible if the relative position in the longitudinal direction of frames in two servo bands is known. Preferably, the relative position of the servo frames is defined by the LTO standard. For example, in the LTO 1-4 standards, the relative position corresponds to a displacement of 33.33 or 66.66 μm, with a tolerance of ±4.16 μm. Thus the timing relationship between the signals input to the two servo channels 902A, 902B is also known due to the tape velocity being estimated with high precision. Alternatively, the relative position can be measured by using synchronization patterns from the individual servo channels. The timing information is sent by a delay element 900A, 900B in the "good" channel to a monitoring and control module 902A, 902B in the "bad" channel, with a delay that depends on the relative displacement of the servo bands and on the tape velocity. Such timing information may be viewed as a pseudo-timing signal to permit the bad channel to maintain synchronization and immediately detect the beginning of servo bursts at the end of the fading event. Therefore, the need for re-synchronization after a fading event is avoided, thus avoiding additional latency and loss of LPOS information.

Figure 10:
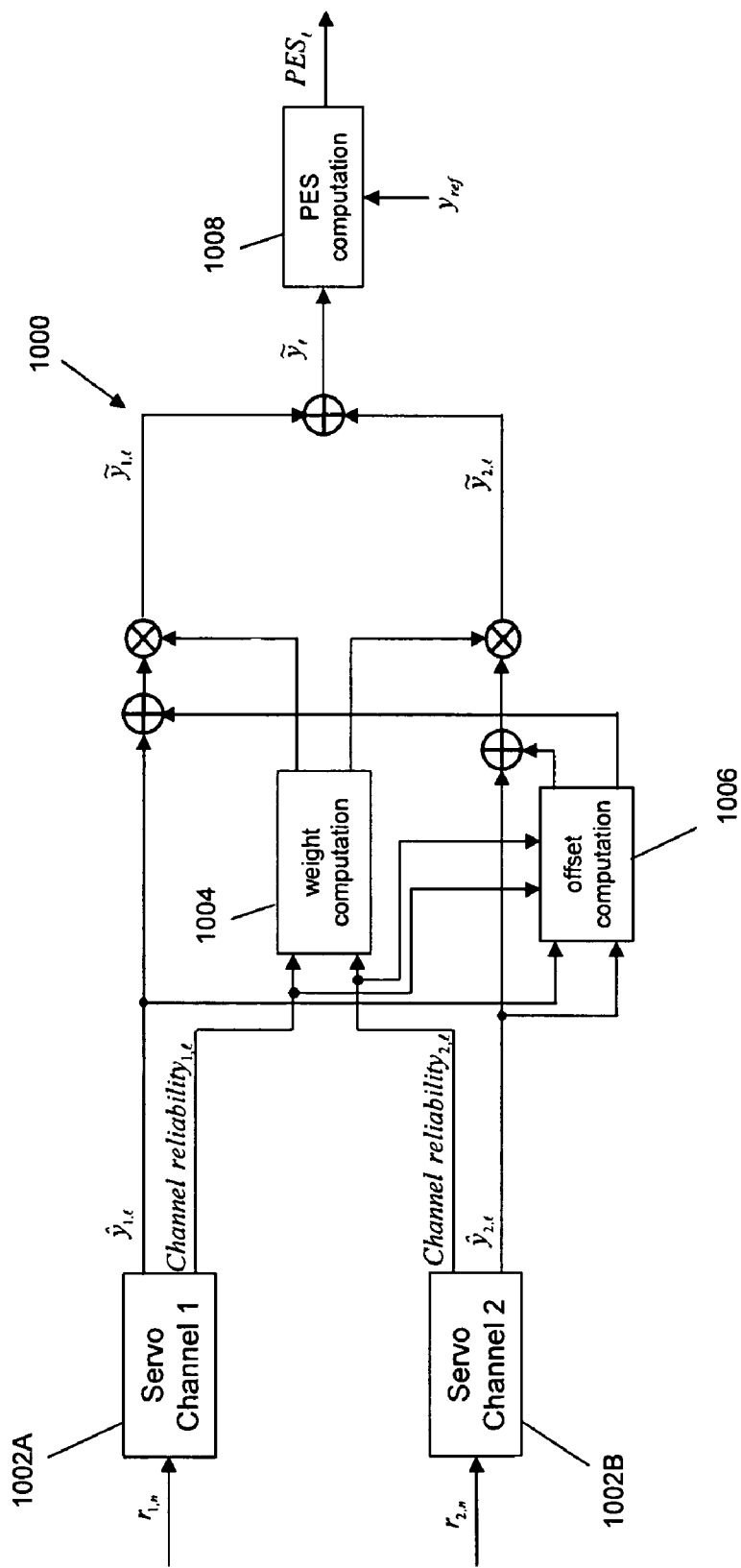
FIG. 10 is a block diagram of another embodiment of a timing-based servo module of the present invention, in which y-position offset compensation and combining of y-estimates is performed.

In a third aspect of the invention, the y-position estimates from the two servo channels are continuously compared. Offset terms to compensate for differences between the y-estimates from the two channels are also computed. By applying compensation of the offset terms, discontinuities in the PES sequence are avoided, which otherwise might lead to undesired effects, e.g., stop-write events in case the difference between y-estimates is of the order of a few micrometers. In the embodiment 1000 depicted in FIG. 10, after compensating for offset terms and weighting, the resulting y-estimate values $\tilde{y}_{1,l}$ and $\tilde{y}_{2,l}$ are combined to yield the combined estimate $\tilde{y}_l$. The PES computation element then compares the combined estimate $\tilde{y}_l$ with a reference value $y_{ref}$ to provide the position error signal $PES_l$. The weights for combining may be obtained by considering a measure of the channel reliability of the individual servo channels, similar to LPOS combining.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable storage media include recordable-type storage media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for decoding LPOS information from parallel channels of a timing-based servo module in a linear tape drive.

What is claimed is:

1. A timing-based servo module in a linear tape drive, comprising:
    a first servo channel coupled to receive a first digital servo signal read from a data tape by a servo element, the first servo channel comprising:
        a first output for a first unweighted metric; and
        a second output for a first measure of the channel reliability;
    a second servo channel coupled to receive a second digital servo signal read from the data tape by the servo element, the second servo channel comprising:
        a first output for a second unweighted metric; and
        a second output for a second measure of the channel reliability;
    a weight computation module operable to provide a first weight signal and a second weight signal using the measures of channel reliability from the first and second servo channels;
    a first multiplying node coupled to receive the first unweighted metric and the first weight signal and operable to output a first weighted metric;
    a second multiplying node coupled to receive the second unweighted metric and the second weight signal and operable to output a second weighted metric; and
    a summing node coupled to receive the first and second weighted metrics and operable to output a combined weighted metric to an LPOS word decoder.

2. A timing-based servo module in a linear tape drive, comprising:

a first servo channel coupled to receive a first digital servo signal read from a data tape by a servo element, the first servo channel comprising:
- a first output for a first unweighted metric; and
- a second output for a first signal-to-distortion ratio (SDR) estimate;

a second servo channel coupled to receive a second digital servo signal read from the data tape by the servo element, the second servo channel comprising:
- a first output for a second unweighted metric; and
- a second output for a second SDR estimate;

a weight computation module operable to:
- divide the first SDR estimate by the sum of the first and second SDR estimates to provide a first weight signal; and
- divide the second SDR estimate by the sum of the first and second SDR estimates to provide a second weight signal;

a first multiplying node coupled to receive the first unweighted metric and the first weight signal and operable to output a first weighted metric;

a second multiplying node coupled to receive the second unweighted metric and the second weight signal and operable to output a second weighted metric; and a summing node coupled to receive the first and second weighted metrics and operable to output a combined weighted metric to an LPOS word decoder.

3. The timing-based servo module of claim 2, further comprising:

a first switching node coupled comprising:
- a first input terminal coupled to receive the first SDR estimate output from the first servo channel;
- a second input terminal coupled to receive a first data Valid flag output from the first servo channel; and
- an output terminal coupled to transmit the first SDR estimate to the weight computation module when the first data Valid flag is in a first state and not transmit the first SDR estimate to the weight computation module when the first data Valid flag is in a second state, the first data Valid flag being in the second state in response to a loss of timing event experienced by the first servo channel; and a second switching node coupled comprising:
- a first input terminal coupled to receive the second SDR estimate output from the second servo channel;
- a second input terminal coupled to receive a second data Valid flag output from the second servo channel; and
- an output terminal coupled to transmit the second SDR estimate to the weight computation module when the second data Valid flag is in the first state and not transmit the second SDR estimate to the weight computation module when the second data Valid flag is in the second state, the second data Valid flag being in the second state in response to a loss of timing event experienced by the second servo channel.

4. The timing-based servo module of claim 3, further comprising:

a first monitoring and control module associated with the first servo channel;
a second monitoring and control module associated with the second servo channel;
a first pseudo-timing module associated with the first servo channel and operable to transmit a first pseudo-timing signal to the second monitoring and control module;
a second pseudo-timing module associated with the second servo channel and operable to transmit a second pseudo-timing signal to the first monitoring and control module;

the first monitoring and control module operable to, in response to the second pseudo-timing signal, maintain synchronization with the second servo channel if the first servo channel experiences a loss of timing event and enable the first servo channel to detect a beginning of a servo burst at the end of the loss of timing event; and the second monitoring and control module operable to, in response to the first pseudo-timing signal, maintain synchronization with the first servo channel if the second servo channel experiences a loss of timing event and enable the second servo channel to detect a beginning of a servo burst at the end of the loss of timing event.

5. The timing-based servo module of claim 4, wherein:

the first pseudo-timing module comprises a first delay element operable to delay the transmission of the first pseudo-timing signal to the second monitoring and control module by an amount which is dependent upon the longitudinal displacement of the servo pattern in the servo band on the tape from which the first servo channel reads the servo signal, relative to the servo pattern in the servo band on the tape from which the second servo channel reads the servo signal, and upon the velocity of the data tape past the servo element;

the second pseudo-timing module comprises a second delay element operable to delay the transmission of the second pseudo-timing signal to the first monitoring and control module by an amount which is dependent upon the longitudinal displacement of the servo pattern in the servo band on the tape from which the first servo channel reads the servo signal, relative to the servo pattern in the servo band on the tape from which the second servo channel reads the servo signal, and upon the velocity of the data tape past the servo element.

6. A data storage tape drive, comprising:

a host interface coupled to a host device and operable for transmitting and receiving commands and data to and from the host device;

a write processing module coupled to receive data to be written from the host interface;

a write channel coupled to receive processed write data from the write processing module;

a write head coupled to receive the write data from the write channel and operable to record the data onto a data tape moving past the write head, the data tape including at least one data track between a pair of servo bands;

a read head operable to read data from the data tape moving past the read head, the read head including first and second servo elements for reading servo data from the servo bands;

a read channel coupled to receive the data read by the read head;

a read processing module coupled to receive unprocessed read data from the read channel and transmit processed read data to the host interface;

a first servo channel coupled to receive a first digital servo signal read from the data tape by the first servo element, the first servo channel comprising:
- a first output for a first unweighted metric; and
- a second output for a first measure of the channel reliability;

a second servo channel coupled to receive a second digital servo signal read from the data tape by the second servo element, the second servo channel comprising:
- a first output for a second unweighted metric; and
- a second output for a second measure of the channel reliability;

a weight computation module operable to:

provide a first weight signal and a second weight signal using the measures of channel reliability from the first and second servo channels;
a first multiplying node coupled to receive the first unweighted metric and the first weight signal and operable to output a first weighted metric;
a second multiplying node coupled to receive the second unweighted metric and the second weight signal and operable to output a second weighted metric; and
a summing node coupled to receive the first and second weighted metrics and operable to output a combined weighted metric to an LPOS word decoder.

7. A data storage tape drive, comprising:
a host interface coupled to a host device and operable for transmitting and receiving commands and data to and from the host device;
a write processing module coupled to receive data to be written from the host interface;
a write channel coupled to receive processed write data from the write processing module;
a write head coupled to receive the write data from the write channel and operable to record the data onto a data tape moving past the write head, the data tape including at least one data track between a pair of servo bands;
a read head operable to read data from the data tape moving past the read head, the read head including first and second servo elements for reading servo data from the servo bands;
a read channel coupled to receive the data read by the read head;
a read processing module coupled to receive unprocessed read data from the read channel and transmit processed read data to the host interface;
a first servo channel coupled to receive a first digital servo signal read from the data tape by the first servo element, the first servo channel comprising:
 a first output for a first unweighted metric; and
 a second output for a first signal-to-distortion ratio (SDR) estimate;
a second servo channel coupled to receive a second digital servo signal read from the data tape by the second servo element, the second servo channel comprising:
 a first output for a second unweighted metric; and
 a second output for a second SDR estimate;
a weight computation module operable to:
 divide the first SDR estimate by the sum of the first and second SDR estimates to provide a first weight signal; and
 divide the second SDR estimate by the sum of the first and second SDR estimates to provide a second weight signal;
a first multiplying node coupled to receive the first unweighted metric and the first weight signal and operable to output a first weighted metric;
a second multiplying node coupled to receive the second unweighted metric and the second weight signal and operable to output a second weighted metric; and
a summing node coupled to receive the first and second weighted metrics and operable to output a combined weighted metric to an LPOS word decoder.

8. The tape drive of claim 7, further comprising:
a first switching node coupled comprising:
 a first input terminal coupled to receive the first SDR estimate output from the first servo channel;
 a second input terminal coupled to receive a first data Valid flag output from the first servo channel; and
 an output terminal coupled to transmit the first SDR estimate to the weight computation module when the first data Valid flag is in a first state and not transmit the first SDR estimate to the weight computation module when the first data Valid flag is in a second state, the first data Valid flag being in the second state in response to a loss of timing event experienced by the first servo channel; and
a second switching node coupled comprising:
 a first input terminal coupled to receive the second SDR estimate output from the second servo channel;
 a second input terminal coupled to receive a second data Valid flag output from the second servo channel; and
 an output terminal coupled to transmit the second SDR estimate to the weight computation module when the second data Valid flag is in the first state and not transmit the second SDR estimate to the weight computation module when the second data Valid flag is in the second state, the second data Valid flag being in the second state in response to a loss of timing event experienced by the second servo channel.

9. The tape drive of claim 8, further comprising:
a first monitoring and control module associated with the first servo channel;
a second monitoring and control module associated with the second servo channel;
a first pseudo-timing module associated with the first servo channel and operable to transmit a first pseudo-timing signal to the second monitoring and control module;
a second pseudo-timing module associated with the second servo channel and operable to transmit a second pseudo-timing signal to the first monitoring and control module;
the first monitoring and control module operable to, in response to the second pseudo-timing signal, maintain synchronization with the second servo channel if the first servo channel experiences a loss of timing event and enable the first servo channel to detect a beginning of a servo burst at the end of the loss of timing event; and
the second monitoring and control module operable to, in response to the first pseudo-timing signal, maintain synchronization with the first servo channel if the second servo channel experiences a loss of timing event and enable the second servo channel to detect a beginning of a servo burst at the end of the loss of timing event.

10. The tape drive of claim 9, wherein:
the first pseudo-timing module comprises a first delay element operable to delay the transmission of the first pseudo-timing signal to the second monitoring and control module by an amount which is dependent upon the longitudinal displacement of the servo pattern in the servo band on the tape from which the first servo channel reads the servo signal, relative to the servo pattern in the servo band on the tape from which the second servo channel reads the servo signal, and upon the velocity of the data tape past the servo element;
the second pseudo-timing module'comprises a second delay element operable to delay the transmission of the second pseudo-timing signal to the first monitoring and control module by an amount which is dependent upon the longitudinal displacement of the servo pattern in the servo band on the tape from which the first servo channel reads the servo signal, relative to the servo pattern in the servo band on the tape from which the second servo channel reads the servo signal, and upon the velocity of the data tape past the servo element.

11. A method for decoding LPOS information from parallel channels of a timing-based servo module in a linear tape drive, comprising:
receiving a first digital servo signal read from a data tape by a first servo element associated with a first servo channel;
generating a first unweighted metric from the first digital servo signal;
generating a first signal measure of the channel reliability from the first digital servo signal;
receiving a second digital servo signal read from the data tape by a second servo element associated with a second servo channel;
generating a second unweighted metric from the second digital servo signal;
generating a second measure of the channel reliability from the second digital servo signal;
providing a first weight signal and a second weight signal using the measures of channel reliability from the first and second servo channels;
multiplying the first unweighted metric and the first weight signal to generate a first weighted metric;
multiplying the second unweighted metric and the second weight signal to generate a second weighted metric;
adding the first and second weighted metrics to generate a combined weighted servo signal; and
transmitting the combined weighted metric to an LPOS word decoder.

12. A method for decoding LPOS information from parallel channels of a timing-based servo module in a linear tape drive, comprising:
receiving a first digital servo signal read from a data tape by a first servo element associated with a first servo channel;
generating a first unweighted metric from the first digital servo signal;
generating a first signal-to-distortion ratio (SDR) estimate from the first digital servo signal;
receiving a second digital servo signal read from the data tape by a second servo element associated with a second servo channel;
generating a second unweighted metric from the second digital servo signal;
generating a second signal-to-distortion ratio (SDR) estimate from the second digital servo signal;
dividing the first SDR estimate by the sum of the first and second SDR estimates to generate a first weight signal;
dividing the second SDR estimate by the sum of the first and second SDR estimates to generate a second weight signal;
multiplying the first unweighted metric and the first weight signal to generate a first weighted metric;
multiplying the second unweighted metric and the second weight signal to generate a second weighted metric;
adding the first and second weighted metrics to generate a combined weighted servo signal; and
transmitting the combined weighted metric to an LPOS word decoder.

13. The method of claim 12, wherein:
dividing the first SDR estimate by the sum of the first and second SDR estimates comprises dividing first SDR estimate by the first SDR estimate in response to a loss of timing event experienced by the second servo channel; and
dividing the second SDR estimate by the sum of the first and second SDR estimates comprises dividing second SDR estimate by the second SDR estimate in response to a loss of timing event experienced by the first servo channel.

14. The method of claim 13, further comprising:
generating a first pseudo-timing signal and transmitting the first pseudo-timing signal to a second monitoring and control module associated with the second servo channel;
generating a second pseudo-timing signal and transmitting the second pseudo-timing signal to a first monitoring and control module associated with the first servo channel;
in response to the second pseudo-timing signal, maintaining synchronization in the first servo channel with the second servo channel if the first servo channel experiences a loss of timing event and enabling the first servo channel to detect a beginning of a servo burst at the end of the loss of timing event; and
in response to the first pseudo-timing signal, maintaining synchronization of the second servo channel with the first servo channel if the second servo channel experiences a loss of timing event and enabling the second servo channel to detect a beginning of a servo burst at the end of the loss of timing event.

15. The method of claim 14, wherein:
delaying the transmission of the first pseudo-timing signal to the second monitoring and control module by an amount which is dependent upon the longitudinal displacement of the servo pattern in the servo band on the tape from which the first servo channel reads the servo signal, relative to the servo pattern in the servo band on the tape from which the second servo channel reads the servo signal, and upon the velocity of the data tape past the servo element;
delaying the transmission of the second pseudo-timing signal to the first monitoring and control module by an amount which is dependent upon the longitudinal displacement of the servo pattern in the servo band on the tape from which the first servo channel reads the servo signal, relative to the servo pattern in the servo band on the tape from which the second servo channel reads the servo signal, and upon the velocity of the data tape past the servo element.

16. A computer program product of a non-transitory computer readable medium usable with a programmable computer, the computer program product having computer-readable code embodied therein for decoding LPOS information from parallel channels of a timing-based servo module in a linear tape drive, the computer-readable code comprising instructions for:
receiving a first digital servo signal read from a data tape by a first servo element associated with a first servo channel;
generating a first unweighted metric from the first digital servo signal;
generating a first signal measure of the channel reliability from the first digital servo signal;
receiving a second digital servo signal read from the data tape by a second servo element associated with a second servo channel;
generating a second unweighted metric from the second digital servo signal;
generating a second measure of the channel reliability from the second digital servo signal;
providing a first weight signal and a second weight signal using the measures of channel reliability from the first and second servo channels;

multiplying the first unweighted metric and the first weight signal to generate a first weighted metric;

multiplying the second unweighted metric and the second weight signal to generate a second weighted metric;

adding the first and second weighted metrics to generate a combined weighted metric; and transmitting the combined weighted metric to an LPOS word decoder.

17. A computer program product of a non-transitory computer readable medium usable with a programmable computer, the computer program product having computer-readable code embodied therein for decoding LPOS information from parallel channels of a timing-based servo module in a linear tape drive, the computer-readable code comprising instructions for:

receiving a first digital servo signal read from a data tape by a first servo element associated with a first servo channel;

generating a first unweighted metric from the first digital servo signal;

generating a first signal-to-distortion ratio (SDR) estimate from the first digital servo signal;

receiving a second digital servo signal read from the data tape by a second servo element associated with a second servo channel;

generating a second unweighted metric from the second digital servo signal;

generating a second signal-to-distortion ratio (SDR) estimate from the second digital servo signal;

dividing the first SDR metric by the sum of the first and second SDR estimates to generate a first weight signal;

dividing the second SDR metric by the sum of the first and second SDR estimates to generate a second weight signal;

multiplying the first unweighted metric and the first weight signal to generate a first weighted metric;

multiplying the second unweighted metric and the second weight signal to generate a second weighted metric;

adding the first and second weighted metrics to generate a combined weighted metric; and transmitting the combined weighted metric to an LPOS word decoder.

18. The computer program product of claim 17, wherein:

dividing the first SDR estimate by the sum of the first and second SDR estimates comprises dividing first SDR estimate by the first SDR estimate in response to a loss of timing event experienced by the second servo channel; and dividing the second SDR estimate by the sum of the first and second SDR estimates comprises dividing second SDR estimate by the second SDR estimate in response to a loss of timing event experienced by the first servo channel.

19. The computer program product of claim 18, wherein the instructions further comprise:

generating a first pseudo-timing signal and transmitting the first pseudo-timing signal to a second monitoring and control module associated with the second servo channel;

generating a second pseudo-timing signal and transmitting the second pseudo-timing signal to a first monitoring and control module associated with the first servo channel;

in response to the second pseudo-timing signal, maintaining synchronization in the first servo channel with the second servo channel if the first servo channel experiences a loss of timing event and enabling the first servo channel to detect a beginning of a servo burst at the end of the loss of timing event; and in response to the first pseudo-timing signal, maintaining synchronization of the second servo channel with the first servo channel if the second servo channel experiences a loss of timing event and enabling the second servo channel to detect a beginning of a servo burst at the end of the loss of timing event.

20. The computer program product of claim 19, wherein:

delaying the transmission of the first pseudo-timing signal to the second monitoring and control module by an amount which is dependent upon the longitudinal displacement of the servo pattern in the servo band on the tape from which the first servo channel reads the servo signal, relative to the servo pattern in the servo band on the tape from which the second servo channel reads the servo signal, and upon the velocity of the data tape past the servo element;

delaying the transmission of the second pseudo-timing signal to the first monitoring and control module by an amount which is dependent upon the longitudinal displacement of the servo pattern in the servo band on the tape from which the first servo channel reads the servo signal, relative to the servo pattern in the servo band on the tape from which the second servo channel reads the servo signal, and upon the velocity of the data tape past the servo element.

* * * * *